United States Patent [19]

Pandapas, Jr.

[11] 4,119,011
[45] * Oct. 10, 1978

[54] MUSICAL INFORMATION APPARATUS PROVIDING VISUAL AND AUDIBLE OUTPUT

[76] Inventor: George Pandapas, Jr., 322 W. 72nd St., New York, N.Y. 10003

[*] Notice: The portion of the term of this patent subsequent to Jul. 20, 1993, has been disclaimed.

[21] Appl. No.: 779,366

[22] Filed: Mar. 21, 1977

[51] Int. Cl.² ............................................. G09B 15/04
[52] U.S. Cl. ................................................... 84/470 R
[58] Field of Search ............... 84/470 R, 471 SR, 474, 84/478, 1.01, 1.24, DIG. 7

[56] References Cited

U.S. PATENT DOCUMENTS

| 255,979 | 4/1882 | Hauschel | 84/470 |
| 3,460,425 | 4/1966 | Kiepe | 84/470 |
| 3,795,989 | 3/1974 | Greenberg | 84/470 |
| 3,969,973 | 7/1976 | Pandapas | 84/474 |

Primary Examiner—L. T. Hix
Assistant Examiner—S. D. Schreyer
Attorney, Agent, or Firm—Watson, Leavenworth, Kelton & Taggart

[57] ABSTRACT

Display apparatus provides for concurrent visual display and audible reproduction of musical notes individually or in plural. In one embodiment, a top octave generator operates responsively to an input signal having a characteristic which is variable in accordance with the relative positioning of visual display components of the apparatus. In a second embodiment a tone generator provides top octave and lower octave signals and selection is made for audible reproduction by a switching arrangement responsive to relative positioning of visual display components.

15 Claims, 6 Drawing Figures

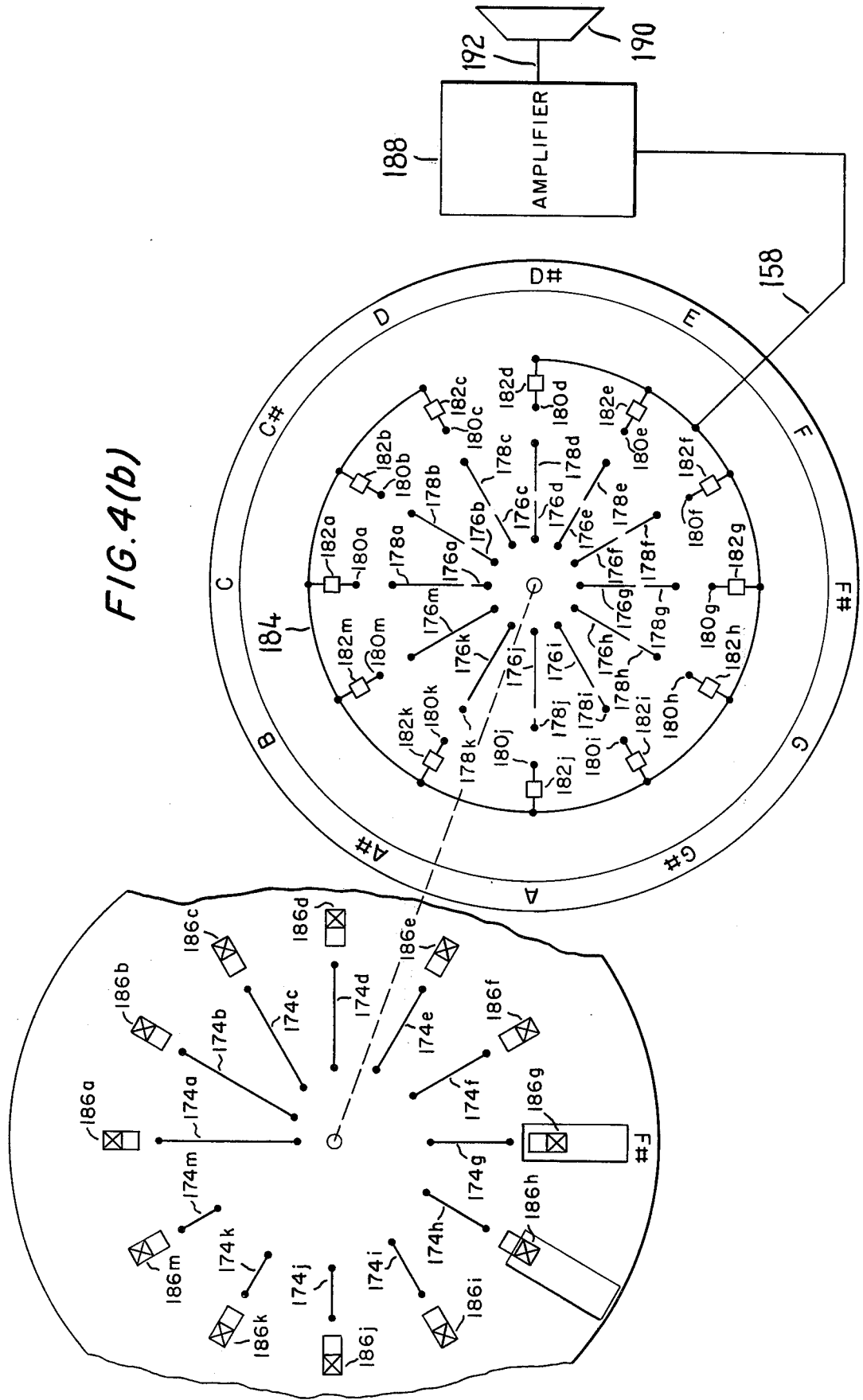

MUSICAL INFORMATION APPARATUS PROVIDING VISUAL AND AUDIBLE OUTPUT

FIELD OF THE INVENTION

This invention relates to apparatus for audible presentation of information and more particularly to devices which are operable to provide for audible and visual presentation of musical information.

BACKGROUND OF THE INVENTION

In U.S. Pat. No. 3,969,973 of applicant, apparatus is disclosed for selective visual display of musical information. The apparatus comprises first and second relatively movable members, the first member bearing spaced musical indicia and the second member including apertures registrable with the first member indicia on such movement. Aperture-closing/opening elements, each operable independently of the condition of closure of the remainder of such elements, are provided in the second member in number corresponding to the number of first member indicia. The musical indicia are arranged in such progression as the chromatic scale and numeric indentifiers are associated with the aperture-closing elements and are arranged in sequential order to be displayed selectively with the musical note indicia on operation of the aperture-closing elements.

SUMMARY OF THE INVENTION

The present invention has as its object the expansion of the output signals in musical devices of the foregoing variety from visual to audible sensibility.

In attaining the foregoing and other objects, the invention coordinates manipulation of such visual output devices with tonal reproduction apparatus. Systems for such coordination and audible output include electrical switching arrangements for identifying the position of the origin-indicating aperture and for identifying the operated aperture-closing elements whereby audible and visual output of the devices are correlated.

The foregoing and other objects and features of the invention will be further evident from the following detailed description of preferred embodiments thereof and from the drawings wherein like reference numerals identify like parts throughout.

DESCRIPTION OF THE DRAWINGS

FIGS. 4(a) and 4(b) show an electrical schematic diagram for the FIG. 3 embodiment.

DESCRIPTION OF THE PREFERRED EMBODIMENTS

Figure 1:
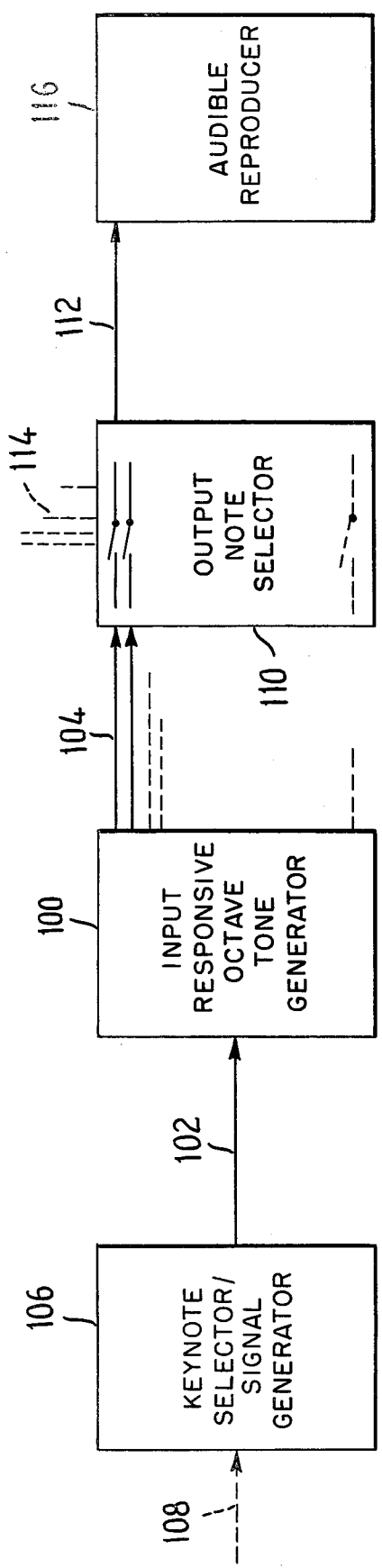
FIG. 1 is a block diagram of one embodiment of the invention.

Referring to FIG. 1, unit 100 is responsive to a signal applied thereto on line 102 to generate output signals on lines 104 which are indicative of tonal frequencies defining a full octave commencing with a keynote identified by the line 102 signal. The line 102 signal is provided by unit 106 in response to keynote selection indicated by mechanical input 108. As noted in detail below, unit 106 may apply a d.c. voltage to line 102 of amplitude variable in accordance with the setting of mechanical input 108. Unit 100 may be of chromatic scale character, providing output signals on lines 104 stepping in frequency from the selected keynote throughout the twelve step chromatic octave.

Lines 104 supply their signals to output note selector 110 which conveys therethrough to line 112 those line 104 signals selected by mechanical inputs 114 to unit 110. As discussed below, mechanical inputs 114 are in number corresponding to the number of lines 104, for example, twelve in the chromatic scale. Such inputs 114 may operate switches in unit 110 which are selected, individually or in plural, in accordance with preselected chromatic scale notes, as also noted below. Audible reproducer 116 provides sound output according with the switches operated responsively to mechanical inputs 114 to selector 110.

Figure 3A:
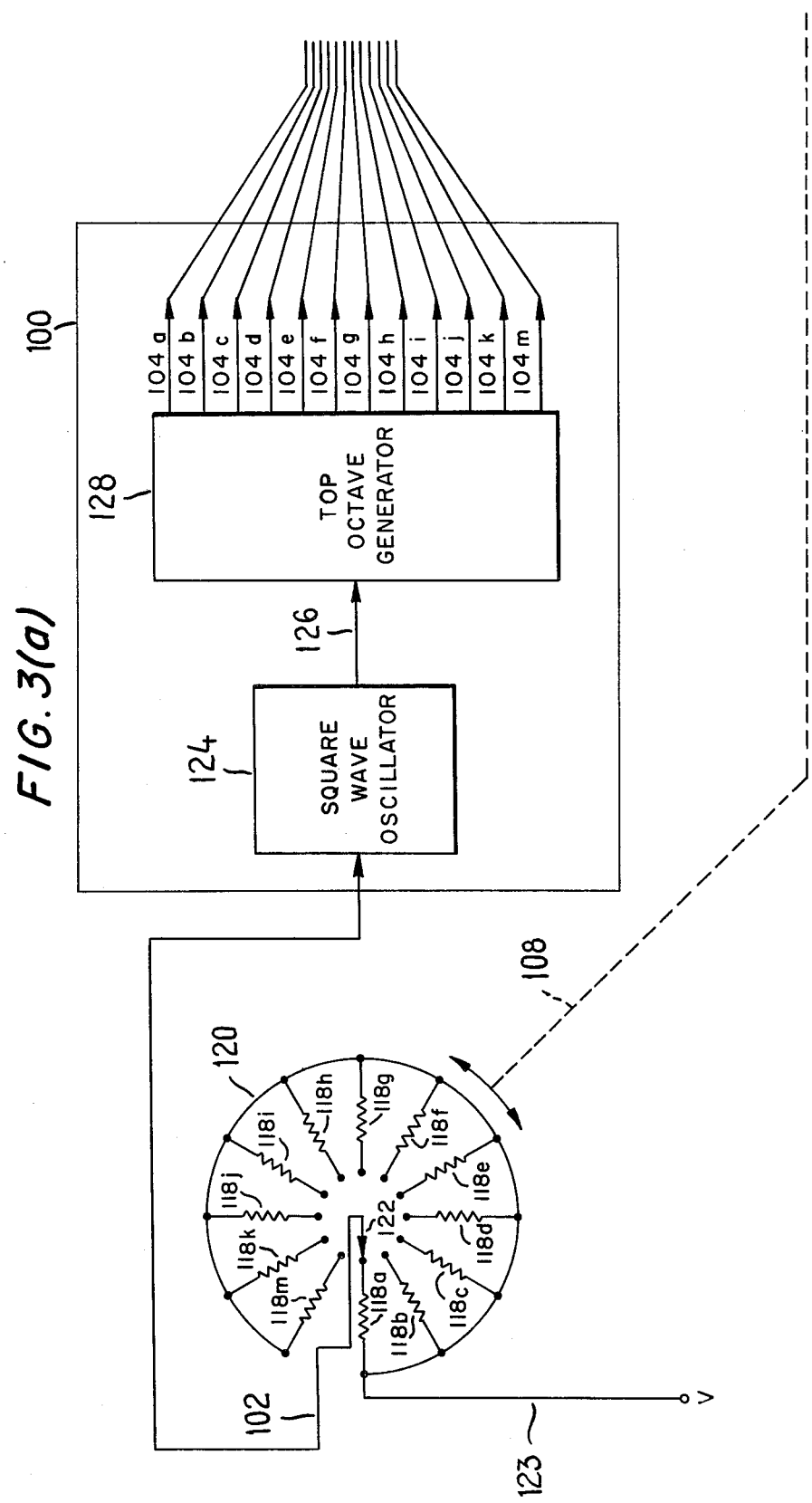
FIGS. 3(a) and 3(b) show an electrical schematic diagram for the FIG. 1 embodiment.
Figure 3B:
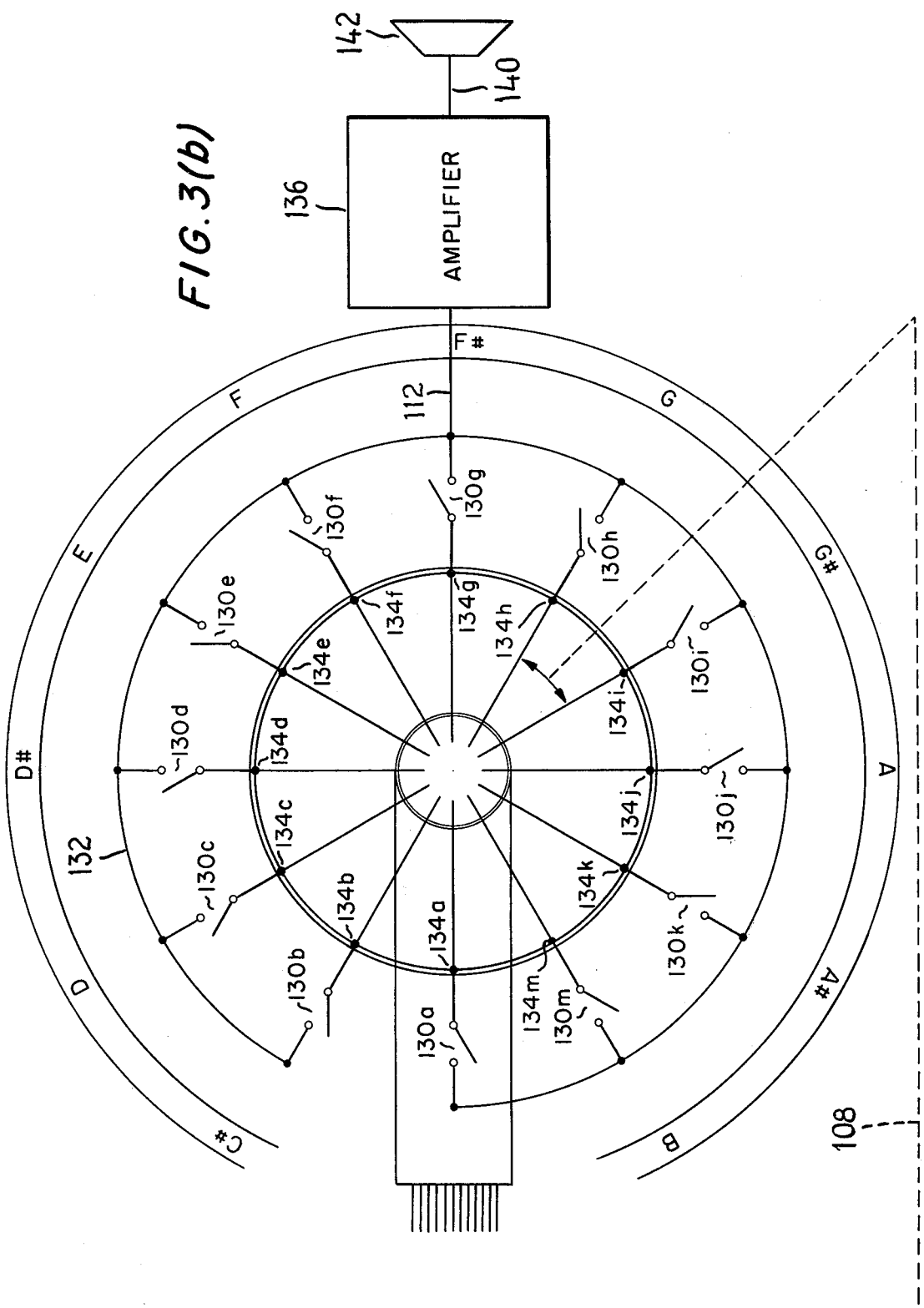

An embodiment of the FIG. 1 system for the chromatic scale is shown in FIGS. 3(a) and 3(b) wherein keynote selector/signal generator 106 is rendered by twelve graduated value resistors 118a through 118m connected in common to line 120. At their opposite ends, the resistors are connected to contacts disposed for engagement individually with contact arm 122. Line 120 is connected through line 123 to a source of d.c. voltage of level V. As contact arm 122 engages different ones of resistors 118a-118m, diverse amplitude d.c. voltages are applied to line 102, which is electrically connected to the contact arm. With contact arm 122 fixedly supported, resistors 118a-118m may be collectively supported on a member rotative relative to the contact arm whereby such engagement of the resistors may be selectively effected by mechanical input 108 applied to such rotative member.

In the embodiment of FIGS. 3(a) and 3(b), octave tone generator 100 is input-responsive and includes square wave oscillator 124 applying its output signal over line 126 to top octave generator 128 which has output lines 104a-104m. Unit 124 may be of type commercially designated NE566 with connection of manufacturer-designated terminals as follows: terminal one grounded; terminal six connected to line 102 of FIG. 2 and to +15 volts through a series circuit having a 0.001 microfarad capacitor and a 1.62 kilohm resistor; terminal three connected to line 126 of FIG. 3(a); terminal eight connected to +15 volts; terminal five connected to the junction of the above-noted 0.001 microfarad capacitor and 1.62 kilohm resistor and through a 7.5 kilohm resistor to ground; and terminal seven to ground through a 0.001 microfarad capacitor. Voltage level V for line 123 of FIG. 3(a) is +15 volts. Top octave generator 128 may be of type commercially designated MK50240, with manufacturer-designated terminals connected as follows: terminal one to +15 volts; terminal two to line 126 of FIG. 3; terminal three to ground; terminals four through fourteen to lines 104b through 104m, respectively; and terminal sixteen to line 104a.

Output note selector 110 of FIG. 1 is rendered in FIG. 3(b) by switches 130a through 130m. First terminals of these switches are connected each through a separate one megohm resistor (not shown) to line 132 with second terminals of the switches connected individually to radially interior contacts. Lines 104a through 104m terminate in contacts 134a-134m which are supported for unitary rotation relative to such radially interior terminals of switches 130a-130m, responsively to mechanical input 108. Line 112 is connected to line 132 and its signals are amplified in amplifier 136 with the amplified signals being applied over line 140 to speaker 142.

In describing a preferred physical embodiment of apparatus in accordance with the invention for implementing the system of FIGS. 3(a) and 3(b), incorporating reference is now made to FIGS. 1 through 5 of above-noted U.S. Pat. No. 3,969,973. In the U.S. Pat. No. 3,969,973, a first disc-shaped member 22 has an upper surface 22a bearing musical indicia $24_1$ through $24_{12}$ at common radial locations. A second disc member 28 is in overlying relation to disc 22 and the discs are concentrically arranged to rotate relative to one another. Disc 28 has apertures $30_1$ through $30_{12}$ at common radial locations and thus registrable with indicia $24_1$ through $24_{12}$ on relative rotation of the discs. Aperture closing/opening elements or gates $40_1$ through $40_{12}$ are movably supported in disc 28 to permit selective visual display of indicia $24_1$ through $24_{12}$. Numeric identifiers 1 through 12 are arranged in disc 28, each in juxtaposition with one of apertures $30_1$ through $30_{12}$, such as to be displayed on opening of the aperture. The first-numbered identifier is used in the present invention to indicate the lowest tone to be sounded.

While various permutations will be evident in interrelating the switching components of the system of FIGS. 3(a) and 3(b) with the U.S. Pat. No. 3,969,973 structure, a preferred arrangement is as follows. Resistors 118a-118m are disposed on the undersurface of overlying disc 28 concentrically therewith. Contact arm 122 is supported on surface 22a of underlying disc 22 and extends radially from the disc center to electrically engage, i.e., to be in series circuit with, a different resistor on rotation of the discs. Switches 130a-130m are supported at common radial locations on surface 22a of underlying disc 22 to register with aperture gates $40_1$-$40_{12}$ and be closed on operation of the gates. Conveniently, switches 130a-130m are magnetically-operated switches and gates $40_1$-$40_{12}$ each supports a magnet movable therewith to overlie the switch on gate operation. Contacts 134a-134m are supported on the undersurface of overlying disc 28 in position to electrically engage the radially interior terminals [FIG. 3(b)] of switches 130a-130m.

By way of example of operation of such composite structure of this disclosure and that of the U.S. Pat. No. 3,969,973, let is be assumed that FIG. 1 of the U.S. Pat. No. 3,969,973 applies, i.e., chromatic scale (FIG. 2, U.S. Pat. No. 3,969,973), interval root note D, and next successive note ($D^\#/E_b$) visually displayed. Resistors 118a-118m have values as follows:

| Resistor | Kilohm Value | Note |
| --- | --- | --- |
| 118a | 3.52 | C/B# |
| 118b | 3.32 | C#/D |
| 118c | 3.14 | D |
| 118d | 2.96 | D#/E |
| 118e | 2.79 | E/F |
| 118f | 2.64 | F/E# |
| 118g | 2.49 | F#/G |
| 118h | 2.35 | G |
| 118i | 2.22 | G#/A |
| 118j | 2.09 | A |
| 118k | 1.98 | A#/B |
| 118m | 1.86 | B/C |

Referring to FIG. 3(a), input 108 rotates the resistor arrangement such that contact arm 122 engages resistor 118c and line 102 supplies an according d.c. voltage level to square wave oscillator 124. Oscillator 124 responds by setting the frequency of the line 126 signal such that the tonal frequency of note D issues from top octave generator 128 on line 104a. The full octave ascending from such interval root note D is now available on lines 104b-104m. With gates $40_1$ (gate one) and $40_2$ (gate two) operated, switches 130c and 130d receive the signals on lines 104a and 104b from contacts 134a and 134b and apply the signals to line 132 whereupon speaker 142 reproduces the notes D and $D^\#/E_b$. The notes may be sounded harmoniously or melodically, as noted below.

Figure 2:
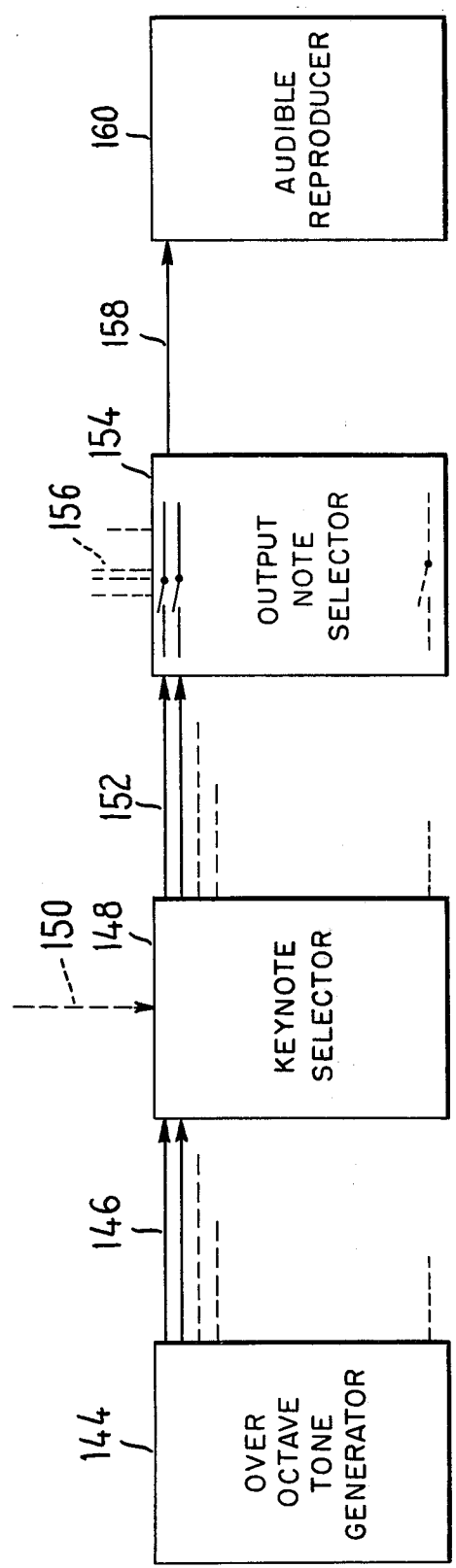
FIG. 2 is a block diagram of a second embodiment of the invention.

Turning now to FIG. 2, a second embodiment of the invention employs "over octave" tone generator 144, i.e., a self-running unit providing output signals indicative of notes extending beyond a single octave, as discussed in detail below in connection with FIG. 4(a). The over octave output signals are conveyed by lines 146 to keynote selector 148 which is responsive to mechanical input 150 to furnish to lines 152 signals indicative of the notes of a full octave commencing from the selected keynote. Output note selector 154, as in the case of selector 110 (FIG. 1), has switches operated by mechanical inputs 156 to convey desired line 152 signals to line 158 whence they are sounded by audible reproducer 160.

Figure 4A:
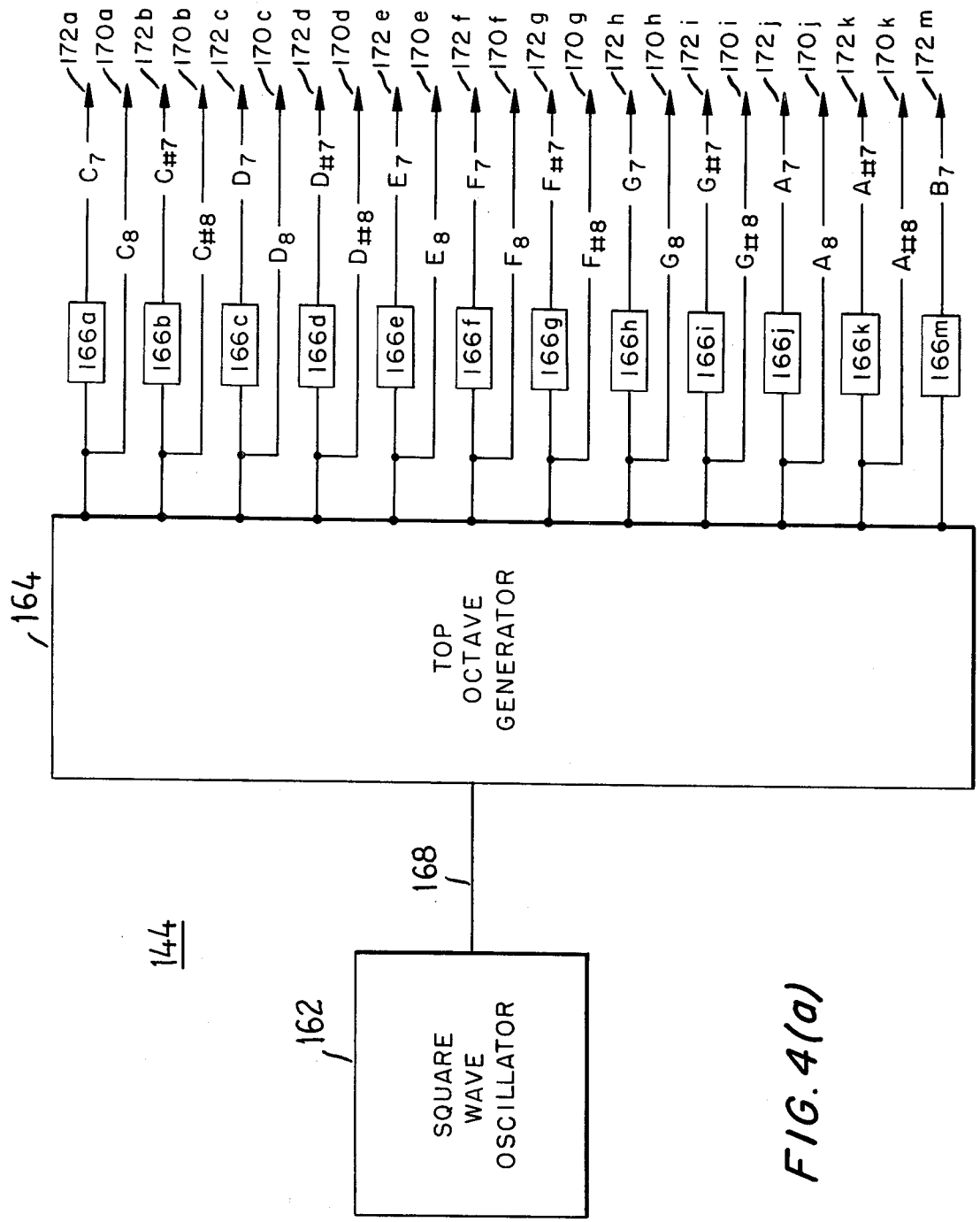

In FIG. 4(a), tone generator 144 is rendered by square wave oscillator 162 of commercially available type NE555 or above-noted type NE566, top octave generator 164 of commercially available type MK50240 and dividers 166a through 166m comprised by six commercially available type 4027 Dual CMOS J-K FF T-Mode Dividers. External connections are made as follows to oscillator 162 of NE555 type: manufacturer-designated terminal one to ground; terminals two and six through a 270 picofarad capacitor to ground and through series resistors of 5.6 kilohms and 470 ohms to 15 volts; terminal three to line 168; terminals four and eight through a 6.2 volt Zener diode to 15 volts; terminal five through a 0.01 microfarad capacitor to ground; and terminal seven to the junction common to such series resistors. Generator 164 has manufacturer-designated terminal one connected to 15 volts, terminal two connected to line 168, terminal three to ground, terminal sixteen to line 170a, terminals four through thirteen respectively to lines 170b through 170k and terminal fourteen to the input of divider 166m. The inputs of dividers 166a through 166k are connected respectively to lines 170a through 170k. The divider outputs are furnished on lines 172a through 172m, which correspond to lines 146 of FIG. 2.

By the foregoing connections, generator 144 (FIG. 2) constantly furnishes output signals of frequencies extending from $C_7$ (C in the seventh octave) to $A^\#_8$ ($A^\#$ in the eighth octave). As will be appreciated, generator 164 supplies the eighth octave signals directly. The seventh octave signals are provided by one-half frequency dividing of the output signals of generator 164.

Keynote selector 148 of FIG. 2 is rendered in the system of FIGS. 4(a) and 4(b) by overlying contacts 174a through 174m the ends of which are disposed on the undersurface of the overlying disc 28 of the U.S. Pat. No. 3,969,973. The contacts are of successively decreasing radial extent, all terminating at a common radial location outwardly of the disc center. Contacts 176a through 176m and 178a through 178k are disposed on surface 22a of underlying disc 22. Contacts 176a-176m are of successively increasing radial extent, all terminating at a common radial location adjacent the disc center. Contacts 178a-178k are of successively decreasing radial extent, all terminating at a common radial location outwardly of the disc center.

For the twelve-step chromatic scale, contact 176m is twelve units of length, contact 176k is eleven units, etc., stepping down by one unit length throughout to contact 176a, which is one unit of length. The separation between contacts 176a and 178a, 176b and 178b, through to 176k and 178k, is one unit of length. Contact 178a is ten units of length, contact 178b is nine, etc., down to contact 178j, one unit of length and contact 178k, which is located at the radially exterior extent of contacts 178a-178j and contact 176m. Contacts 174a-174m successively decrease in length by one unit of length.

In the course of rotation of contacts 174a-174m with respect to contacts 176a-176m and 178a-178k, each of the former engages a selective one of the latter depending upon angular location. For example, in the FIG. 4(b) angular location showing, contact 174g overlies and engages contact 176g. On rotation of contact 174g, however, from such shown six o'clock position to the 12 o'clock position, contact 174g now engages contact 178a. By this arrangement, applicant may select a succession of twelve graduated notes for sounding within the span $C_7$ to $A^\#_8$, for any keynote, simply by conducting the eighth octave note signals from generator 144 to contacts 178a-178k and by conducting the seventh octave note signals from generator 144 to contacts 176a-176m.

The radially outward termini of contacts 174a-174m are arranged at common radial location with terminals 180a through 180m of switches 182a through 182m. These switches implement output note selector 154 of FIG. 2 and terminals 180a-180m correspond to lines 152 of FIG. 2. Second terminals of these switches are connected, each through a separate one megohm resistor (not shown) to line 184 whereby signals conveyed to contacts 174a-174m may be supplied to switches 182a-182m and thence over line 184 to line 158. Magnets 186a through 186m are supported for movement with gate operating elements, as above discussed, to operate switches 182a through 182m. In the FIG. 4(b) showing, magnet 186g is in position operating switch 182g whereby the $F^\#_7$ signal furnished over line 172g to contact 176g is carried through contact 174g, terminal 180g, switch 182g and line 184 to line 158. As will be seen by reference to the U.S. Pat. No. 3,969,973, such gate operation visually presents the indicia $F^\#$. The system of the invention complements such showing with sounding of the note in the lower of two octaves, based on keynote selection. The keynote-identifying aperture is that associated with magnet 186a and contact 174a and would identify the keynote C in the illustrated showing. Magnet 186a is moved on operation of the first-numbered of the gates of the U.S. Pat. No. 3,969,973 and is aligned with the longest contact 174a of contacts 174a-174m to define a starting point, i.e., corresponding to the lowest tone at hand.

The line 158 signals are applied to amplifier 188 which drives speaker 190 over line 192.

Referring jointly to FIG. 2 and FIGS. 4(a) and 4(b), mechanical input 150 to the keynote selector provides for rotation of the member supporting contacts 174a-174m. Mechanical inputs 156 are effected by closure of aperture gates supporting magnets 186a-186m.

While the foregoing embodiments involve devices wherein the musical note indicia-bearing member and aperture-defining member are mutually rotative, the invention contemplates devices wherein other than such relative rotation is embodied. Considering the embodiment of FIGS. 4(a) and 4(b), the electrically conductive strips defining contacts 178a-178k and extending radially inwardly are of mutually different radial extents and the radially outward termini thereof are disposed in a common circular locus. The electrically conductive strips defining contacts 176a-176m and extending radially outwardly are also of mutually different radial extents and have their radially inward termini also disposed in a common circular locus. Such circular loci are evidently not a necessity, since the same function, i.e., selective engagement of contacts 174a-174m with contacts 176a-176m and 178a-178k, may be obtained by non-circular arrangements of the contacts, e.g., along a straight line. For the chromatic scale in such straight line or rectilinear embodiment, the lengths of contacts 174a-174m, 176a-176m, 178a-178k and the separation of the latter two groups of contacts are determined as against a twelve-unit length scale, discussed above. In either case, the arrangements provide for conveyance to switches 182a-182m of admixtures of signals indicative of musical notes in the seventh and eighth octaves, whereby such notes may be simultaneously reproduced.

Linewise arrangement may also evidently be provided for the embodiment of FIGS. 3(a) and 3(b). In such arrangement, resistors 118a-118m are disposed successively along a straight line and contact arm 122 is supported for rectilinear movement relative to the resistors. Contacts 134a-134m and mating contacts of switches 130a-130m are likewise supported for relative rectilinear movement.

The invention contemplates melodic or harmonic note sounding, i.e., the sounding of notes individually successively or jointly. To this end, switches 130a-130m and switches 182a-182m and operators therefore may be of type providing that first extent movement of the operators will both display the note indicia and sound the note in on-off fashion with second extent movement latching the switch to affect continuous note sounding while maintaining indicia display.

While various specific structure is shown in the foregoing for elements in the described systems, e.g., conductive strip contacts, magnetically operated switches and the like, the invention of course contemplates substitutions known in the art for such components. Also, while the invention is disclosed in the embodiment of FIGS. 4(a) and 4(b) as providing for reproduction of notes in the seventh and eighth octaves, the invention contemplates the use of programmable dividers with the fixed dividers 166a-166m. In this connection use may be made of Type MC14536 programmable timer with appropriate binary code decimal input thereto for selecting notes in octaves below the eighth octave. Alternatively, one may change the value of the tone control resistor (5.6 kilohm above) in the NE555 circuit to shift from the seventh and eighth octaves to other desired octaves.

The foregoing and other changes to the particularly described embodiments may be introduced without deparing from the invention. Accordingly, the illustrated preferred embodiments are to be understood as set forth in a descriptive rather than in a limiting sense. The true spirit and scope of the invention is set forth in the following claims.

What is claimed is:

1. A musical information display device comprising first and second members supported for movement relative to one another, said first member bearing spaced musical note indicia, said second member having viewing apertures registrable with said indicia, a plurality of closure members each movable independently of movement of the remaining of said closure members to provide selective visual display of said indicia through said apertures, and circuit means responsive to such movement of said closure members to produce audible output signals indicative of the tonal character of such visually displayed indicia.

2. The invention claimed in claim 1 wherein said means responsive to movement of said closure members comprises switch means arranged for closure on said movement of said closure members, tone generator means for supplying a plurality of musical note indicative signals to said switch means and audible reproducer means connected to said switch means for providing said output signals.

3. The invention claimed in claim 2 further including control means for supplying an input signal to said tone generator means having a characteristic indicative of the relative positioning of said first member with respect to said second member.

4. The invention claimed in claim 3 wherein said tone generator means includes oscillator means connected to said control means and controllable in frequency of oscillation by said input signal and an octave generator providing said plurality of musical note indicative signals in accordance with the frequency of oscillation of said oscillator means.

5. The invention claimed in claim 4 wherein said first and second members are mutually rotative, said control means providing said input signal in accordance with the relative rotational position of said first member with respect to said second member.

6. The invention claimed in claim 5 wherein said control means comprises a plurality of resistors supported on one of said first and second members and of respectively diverse ohmic values, voltage supply means for supplying a common voltage level to said resistors and contact means for selectively electrically connecting said resistors to said oscillator means for providing said input signal thereto.

7. The invention claimed in claim 2 wherein said tone generator means generates first and second pluralities of musical note indicative signals, said device further including selector means for interconnecting said tone generator means and said switch means, said selector means having first and second contact means connected to said tone generator means, respectively for receipt of said first and second pluralities of musical note indicative signals and third contact means for selectively connecting said first and second contact means with said switch means whereby selected of said first and second musical note indicative signals may be supplied to said switch means.

8. The invention claimed in claim 7 wherein said first and second members are mutually rotative about a common center, said first contact means comprising conductive members extending fixedly radially outwardly from said center, said second contact means comprising conductive members extending fixedly radially inwardly toward said first contact means conductive members and radially spaced therefrom, said third contact means comprising conductive members extending radially of said center and selectively engageable with said first contact means conductive members and said second contact means conductive members in accordance with relative rotation of said first and second members.

9. The invention claimed in claim 8 wherein said conductive members of said first contact means are of mutually different radial extent and wherein said conductive members of said second contact means are of mutually different radial extent.

10. The invention claimed in claim 9 wherein radially inward termini of said conductive members of said first contact means are disposed in a common circular locus and wherein radially outward termini of said conductive members of said second contact means are disposed in a common circular locus.

11. The invention claimed in claim 7 wherein said tone generator means comprises a top octave generator for generating said second plurality of musical note indicative signals, circuit means for conveying said second plurality of musical note indicative signals from said top octave generator to said second contact means, frequency divider means connected to said top octave generator and receiving said second musical note indicative signals therefrom for generating said first plurality of musical note indicative signals and circuit means for conveying said first musical note indicative signals to said first contact means.

12. The invention claimed in claim 11 wherein said tone generator means further includes oscillator means for supplying a constant frequency input signal to said top octave generator.

13. A musical information display device comprising a first member having a surface bearing spaced musical indicia, a second member overlying said first member surface and movable relative to said first member, said second member having apertures registrable with said first member indicia on such relative movement of said first and second members, a closure element for each said aperture operable for opening the same to provide display therethrough of the first member indicium registered therewith, each said closure element being operable independently of operation of the others of such closure elements, and circuit means responsive to such operation of said closure elements to produce audible output signals indicative of the tonal character of such displayed indicia.

14. The invention claimed in claim 13 wherein said circuit means includes tone generator means for generating first and second pluralities of musical note indicative signals in respective different octaves and switch means for receipt of said first and second pluralities of note indicative signals, said switch means being settable on such operation of said closure elements to produce audible output signals indicative of tonal character of such displayed indicia encompassing both of said different octaves.

15. The invention claimed in claim 13 including a numeric identifier adjacent each said aperture and displayed upon operation of the closure element for said aperture.

* * * * *